United States Patent [19]

Sezai

[11] Patent Number: 5,418,539

[45] Date of Patent: May 23, 1995

[54] METHOD OF PERFORMING BEAM COMPRESSION PROCESS ON ANTENNA PATTERN OF RADAR

[75] Inventor: Toshihiro Sezai, Tokyo, Japan

[73] Assignee: National Space Development Agency of Japan, Tokyo, Japan

[21] Appl. No.: 297,721

[22] Filed: Aug. 22, 1994

[30] Foreign Application Priority Data

Sep. 13, 1993 [JP] Japan .................. 5-249691

[51] Int. Cl.6 ........................ G01S 3/16; G01S 3/28
[52] U.S. Cl. ........................ 342/378; 342/157
[58] Field of Search ............ 342/372, 378, 380, 383, 342/157

[56] References Cited

U.S. PATENT DOCUMENTS

| | | | |
|---|---|---|---|
| 5,021,793 | 6/1991 | Stangel et al. | 342/383 |
| 5,296,864 | 3/1994 | Sezai | 342/382 |

*Primary Examiner*—Theodore M. Blum
*Attorney, Agent, or Firm*—Armstrong, Westerman, Hattori, McLeland & Naughton

[57] ABSTRACT

An antenna system comprises a main antenna for use of transmission and reception and a pair of sub-antennas use of only reception. The antenna beam of the system is scanned in the direction of a beam width to be compressed. Both received signals of the main antenna and the sub-antennas are fed to a signal processing circuit. The signal processing circuit converts these received signals to power signals and then performs signal processing on them. In this signal processing, the power signal received by the main antenna is output as a final output signal only if both double differential coefficients of the received signals received by the main antenna and the sub-antennas are equal to or less than corresponding predefined positive real number values, and if the phase difference between the power signal received by the main antenna and the power signal received by the sub-antennas is equal to or less than 90°, thereby producing the output signal representing faithfully the distribution of scattering objects without distortion.

4 Claims, 10 Drawing Sheets

PRIOR ART

METHOD OF PERFORMING BEAM COMPRESSION PROCESS ON ANTENNA PATTERN OF RADAR

BACKGROUND OF THE INVENTION

1. Field of the Invention

The present invention relates to a method of performing beam compression on an antenna pattern of a radar, which can provide better performance in the beam compression without introducing distortion.

2Description of the Related Art

In general, a beam width is one of indexes representing the performance of an antenna pattern of a receiving antenna or other type antennas. A narrower beam width of an antenna pattern will give a better performance. However, there is a relationship of inverse proportion between a beam width and the size (length) of an antenna. Therefore, if the beam width is reduced, then the size of the antenna will be increased. Conversely, if the dimension of the antenna is reduced, then the beam width will be broadened.

For example, in an antenna for a radar system, if it is desired to double the ability or the resolution to discriminate objects, it is required to halve the beam width and thus it is required to double the size of the antenna. The doubling of the size leads to not only a larger occupied region but also various disadvantages such as an increase in the weight of the antenna and in the size of a structure for supporting the antenna. Conversely, if the size of an antenna is halved, then the beam width will be doubled and the discrimination ability will be degraded by a factor of two.

It is well known that there is such a conflicting relationship between a beam width and the size of an antenna. In most cases, an actual antenna has a limitation in the region it can occupy. Therefore, under these limited conditions, a certain degree of compromise associated with the beam width has to be made.

Figure 1:
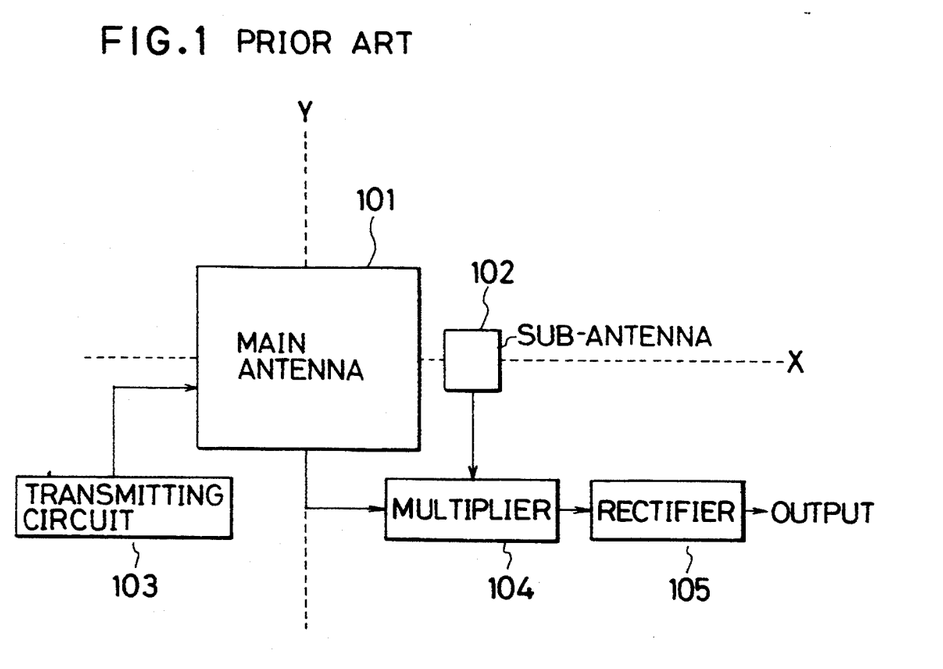
FIG. 1 is a schematic diagram illustrating a configuration of a conventional radar antenna system according to the multiplicative array principle.

One known beam compression technique to alleviate the above-described problems is to reduce the beam width by means of multiplication of received signals of a plurality of antennas according to the multiplicative array principle. FIG. 1 is a schematic diagram illustrating a configuration of a radar system which can perform the beam compression in such a manner described above. In this figure, reference numeral 101 designates a main antennas such as an array antenna comprising a plurality of radiation elements which are equally spaced along a straight line. Reference numeral 102 designates a sub-antenna disposed apart from the main antenna 101 in the X-direction which is the direction of a beam-width to be reduced. Reference numeral 103 designates a transmitting circuit which generates transmission power, which is in turn fed to the main antenna 101. Reference numeral 104 designates a multiplying circuit (multiplier) which performs multiplication between a received electric field signal received by the main antenna 101 and a received electric field signal received by the sub-antenna 102. Reference numeral 105 designates a rectifying circuit (rectifier) which provides an output signal only when the multiplied output signal from the multiplying circuit 104 is positive. In FIG. 1, the beam-axis direction is perpendicular to the X-Y plane or the plane of the drawing.

Figure 2:
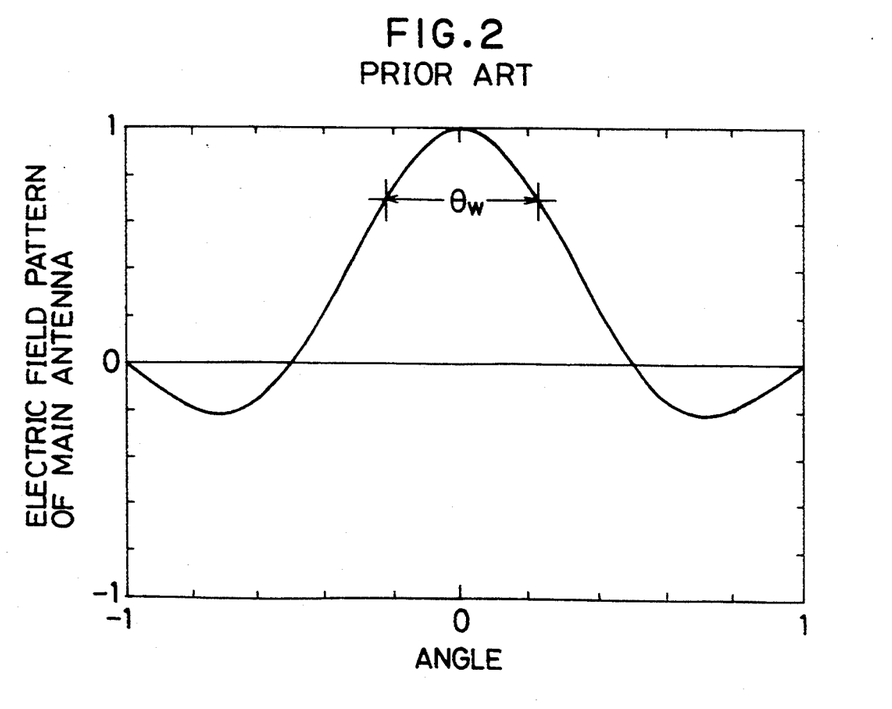
FIG. 2 is a schematic representation of a received electric field pattern associated with a main antenna of the conventional radar antenna system which performs beam compression.
Figure 3:
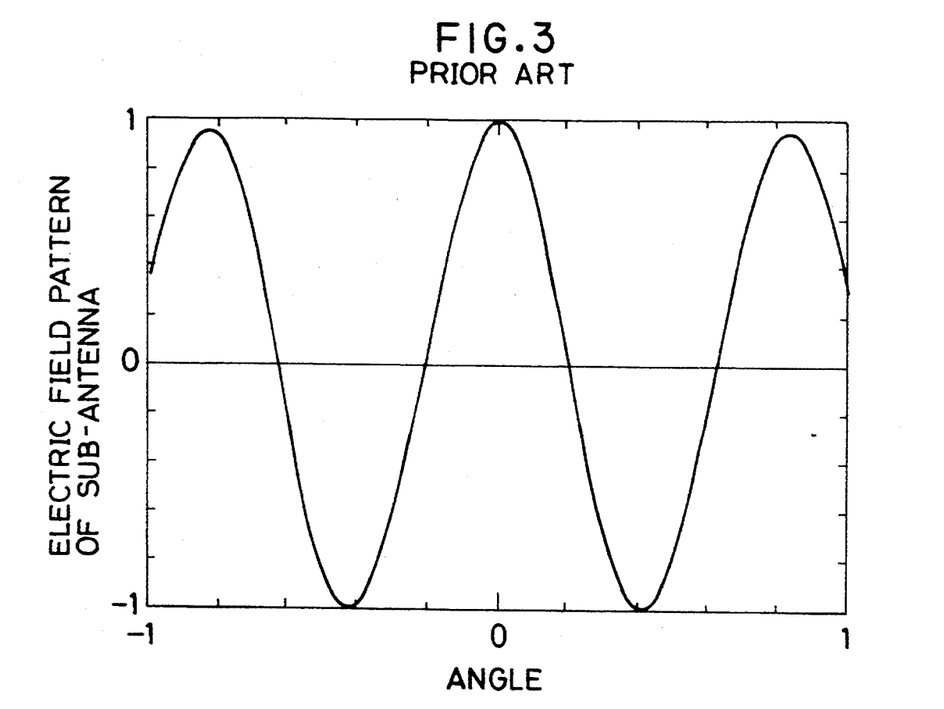
FIG. 3 is a schematic representation of a received electric field pattern associated with a sub-antenna of the conventional radar antenna system which performs beam compression.

In the antenna system having such a configuration described above, electric field signals received by the respective antennas 101 and 102 are fed in the same phase to the multiplying circuit 104 so as to perform the multiplication on these signals. The multiplied signal is output via the rectifying circuit 105 only if the multiplication result is positive. As a result, a received electric field signal (electric field pattern) corresponding to the directional characteristic of the main antenna 101 such as that shown in FIG. 2 is multiplied by a received electric field signal (electric field pattern) corresponding to the directional characteristic of the sub-antenna 102 such as that shown in FIG. 3, thus providing an output signal (output pattern), such as that shown in FIG. 4, corresponding to the synthetic directional characteristic having a beam width $\theta$ wc which is reduced from the beam width $\theta$ w of the electric field pattern associated with the main antenna.

Figure 4:
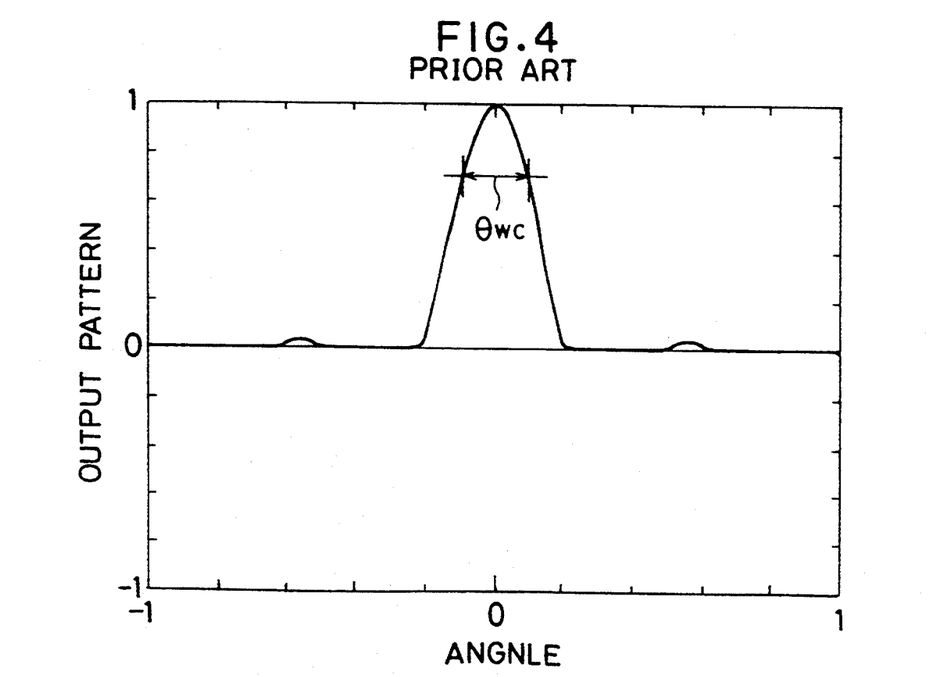
FIG. 4 is a schematic representation of an output signal pattern obtained after beam compression is performed by the conventional radar antenna system.

In the beam compression method of an antenna pattern according to the conventional technique based on the above-described multiplicative array principle, there is a problem that it is impossible, as a matter of course, to achieve a resolution better than that corresponding to the beam width $\theta$ wc of synthetic directional characteristic, shown in FIG. 4, obtained by performing the multiplication process on the received electric field signals.

In the beam compression method according to the multiplicative array principle, since a sub-antenna is located off the scanning rotation axis, a large grating lobe occurs. Similarly, in the case where a pair of sub-antennas are used, a large distance between sub-antennas causes a large grating lobe. As a result, even at angles at which no scattering object exists, if the grating lobe is directed to a scattering object, the sub-antenna produces a rather great received signal due to a received radio wave corresponding to the grating lobe. Therefore, if the beam compression is performed by simply multiplying the received signal associated with the main antenna by the received signal associated with the sub-antenna, distortion occurs in the received pattern.

To solve the above problem, the inventor of the present invention has proposed a beam compression method in U.S. patent application Ser. No 08/217,064 (Japanese Patent Application No. 5-131035). In this previously proposed invention, the beam width compression is performed by multiplying the received power signal associated with the main antenna by that associated with the sub-antenna instead of multiplying the received electric field signal associated with the main antenna by that associated with the sub-antenna thereby achieving better resolution, wherein an output signal is provided only if the cosine value corresponding to the phase difference between the received power signal associated with the main antenna and that associated with the sub-antenna is positive thereby preventing the distortion in the output signal.

In general, the power signal received by an antenna can be represented by the square of the received antenna electric field signal. If the received power pattern is compared to the received electric field pattern, the received power pattern has a less spread pattern, that is, the received power pattern has a narrower beam width than the received electric field pattern. Therefore, in the beam compression method of an antenna pattern according to the multiplicative array principle, if the received power signal associated with an antenna is used instead of the received electric field signal, it is possible to compress the beam to a narrower width.

Figure 5:
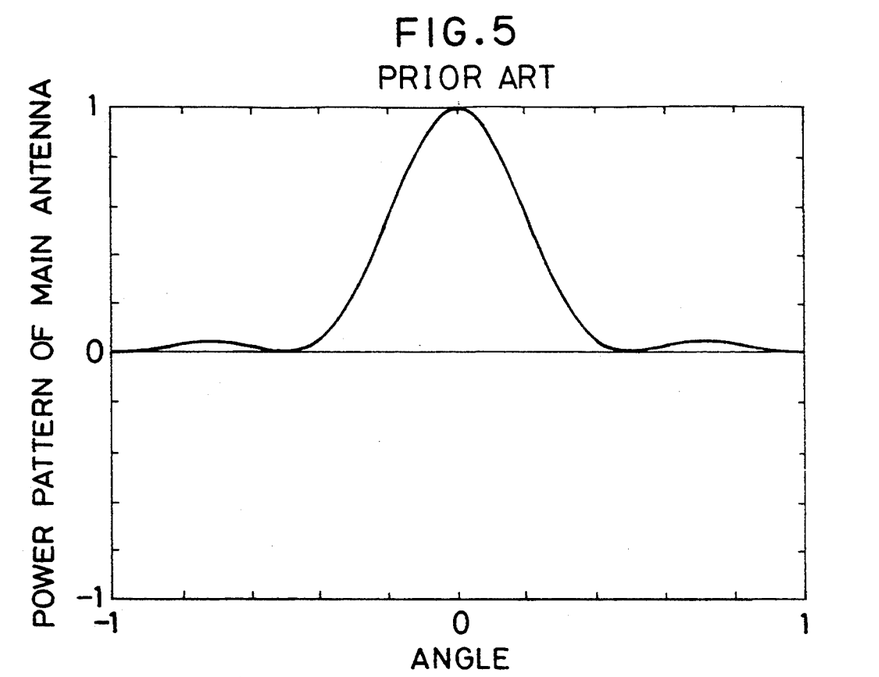
FIG. 5 is a schematic representation of a power pattern associated with a main antenna, which is produced from a received signal of the main antenna based on the method of performing beam compression of an antenna pattern according to the previous invention.
Figure 6:
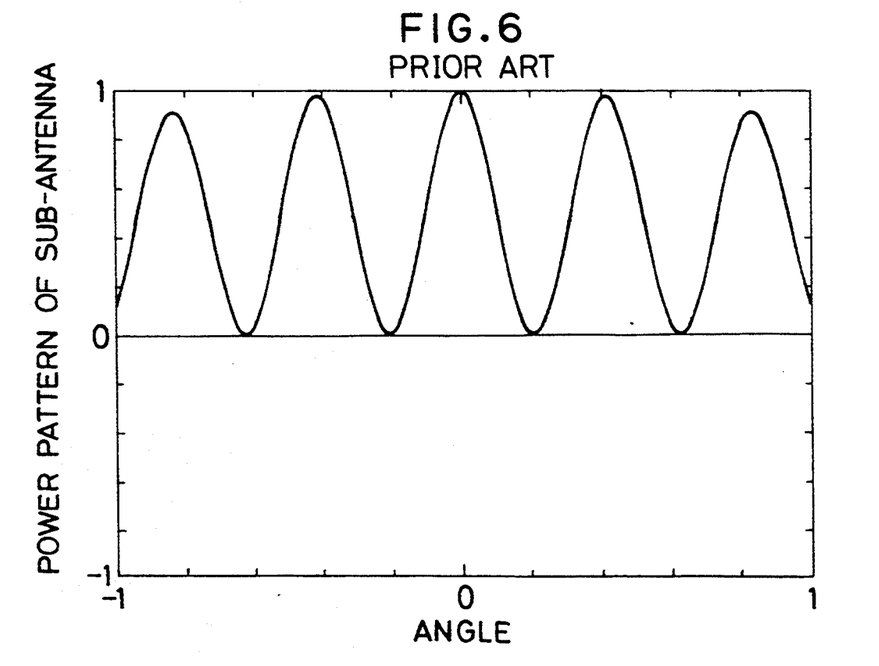
FIG. 6 is a schematic representation of a power pattern associated with a sub-antenna, which is produced from a received signal of the sub-antenna according to the previous invention.
Figure 7:
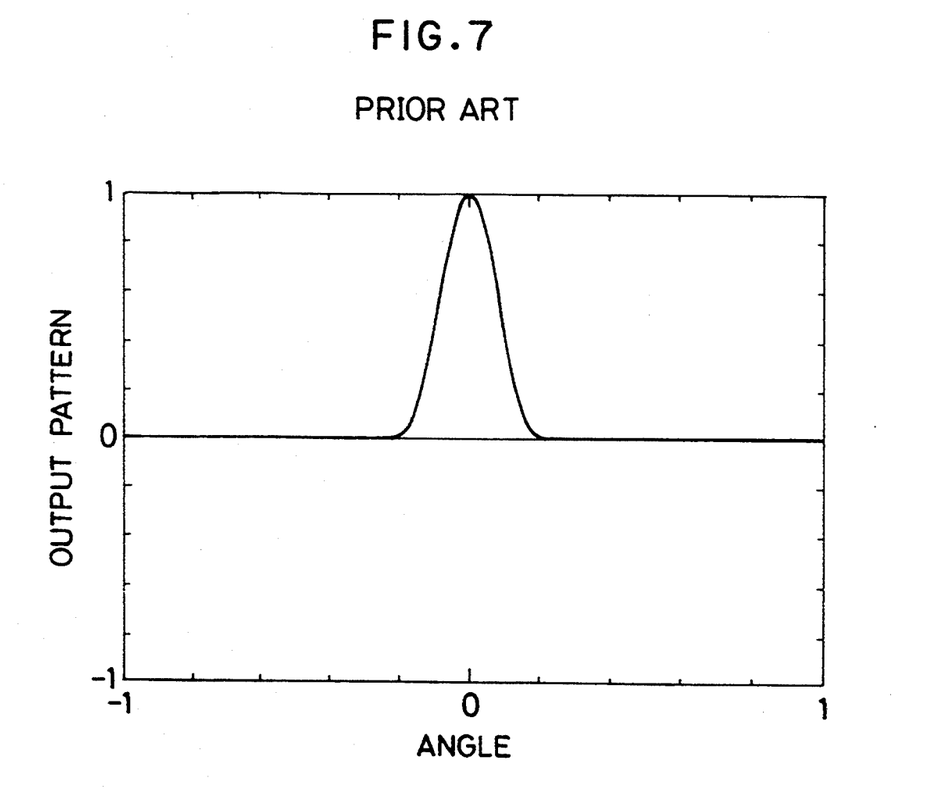
FIG. 7 is a schematic representation of a pattern of an output signal which is obtained by performing beam compression according to the previous invention.

FIGS. 5–7 illustrate a power pattern of a main antenna, a power pattern of a sub-antenna, and an output signal pattern obtained by performing beam compression based on a power signal, respectively.

The phase difference between the grating lobe of the sub-antenna and the main beam of the main antenna, or the phase difference between the main beam and the grating lobe of the sub-antenna is about 180° which is greater than 90°. Therefore, in the case where there is no scattering object in the main beam direction of the main antenna, and there is a scattering object in the grating lobe of the sub-antenna, the phase difference between the received signal associated with the main antenna and that associated with the sub-antenna becomes greater than 90°, and thus the signal corresponding to the cosine of the phase difference between the received signal associated with the main antenna and that associated with the sub-antenna becomes negative. Thus, in the beam compression method according to the previous invention, the distortion is prevented by outputting a zero signal in the case where the phase difference between the received signal associated with the main antenna and that associated with the sub-antenna is greater than 90°.

However, if the distance between scattering objects is small, the phase difference between the signal received by the main antenna and the signal received by the sub-antenna arising from its grating lobe can be smaller than 90° near angles at which the short-distance scattering objects exist. This means that in the beam compression method which provides an output signal only when the cosine value corresponding to the phase difference is positive, scattering objects located at a short distance from each other cannot be distinguished.

SUMMARY OF THE INVENTION

It is an object of the present invention to solve the above-described problem in the beam compression method according to the previous invention. More specifically, it is an object of the present invention to provide a method of compressing the beam width of an antenna pattern of a radar antenna, which can give an output signal representing scattering objects more faithfully without producing distortion.

To achieve the above objects, the present invention provides a method of compressing the beam width of the antenna pattern of a radar system, comprising the steps of: providing an antenna system comprising a main antenna for transmitting and receiving radio waves and one or more pairs of dedicated receiving sub-antennas which are disposed at both sides adjacent to the main antenna in the direction of the beam width to be compressed of the main antenna such that the directions of the beam axes of the sub-antennas coincide with the direction of the beam axis of the main antenna; scanning the antenna beam of the antenna system in the direction of the beam width to be compressed, and receiving by the main antenna and sub-antennas the radio wave which was transmitted by the main antenna and reflected by scattering objects and has finally come back; converting the respective received signals received by the main antenna and the sub-antennas to power signals; performing double differential processing with respect to the scanning angle on the received power signals received by the main antenna and the sub-antennas, respectively, thereby producing double differential coefficients of the received power signals associated with the main antenna and the sub-antennas, respectively; calculating the phase difference between the received power signal received by the main antenna and the received power signal received by the sub-antennas; and outputting the received power signal received by the main antenna as a final output signal only if the conditions that both the double differential coefficients of the received power signals associated with the main antenna and the sub-antennas be equal to or less than predefined corresponding positive real number values and that the phase difference be equal to or less than 90° are satisfied, and outputting a zero signal as the final output signal if the conditions are not satisfied.

Figure 8:
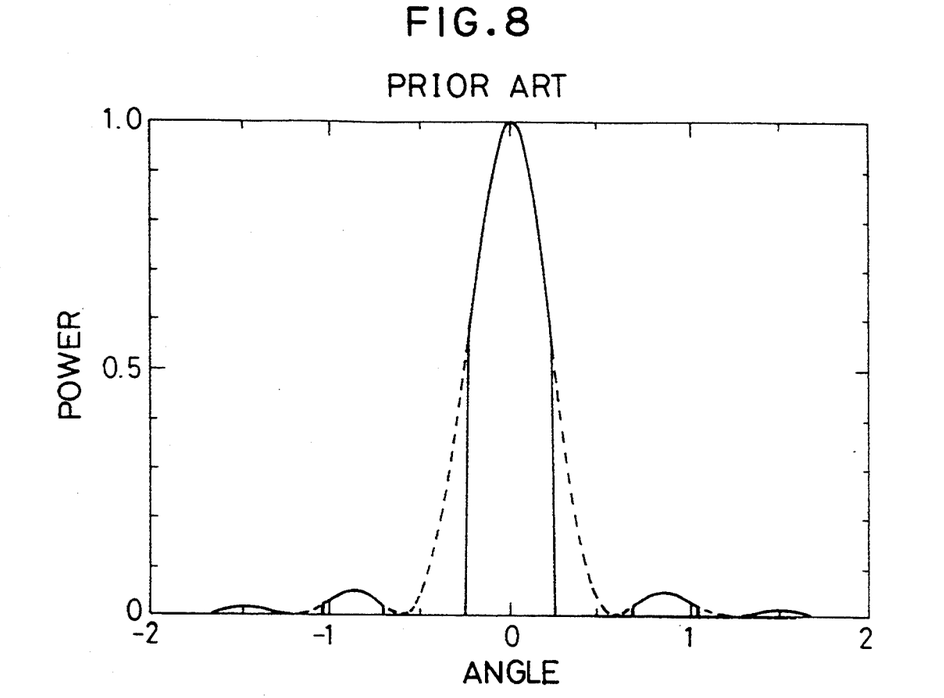
FIG. 8 is a schematic representation of a received power signal associated with the main antenna, in which portions having an upwardly convex form are illustrated.
Figure 9:
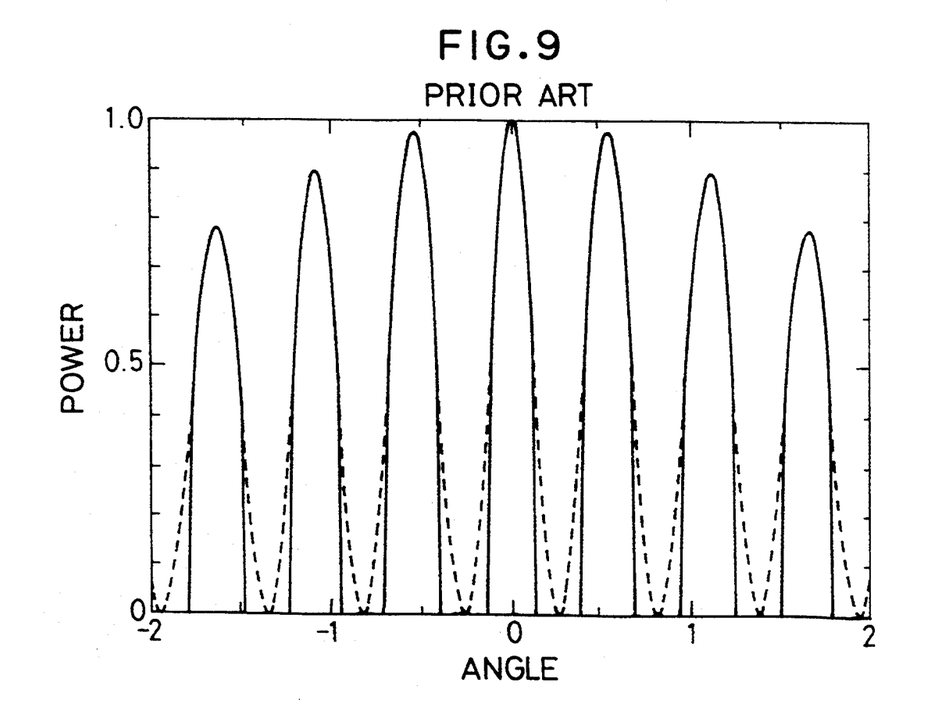
FIG. 9 is a schematic representation of a received power signal associated with the sub-antenna, in which portions having an upwardly convex form are illustrated.
Figure 10:
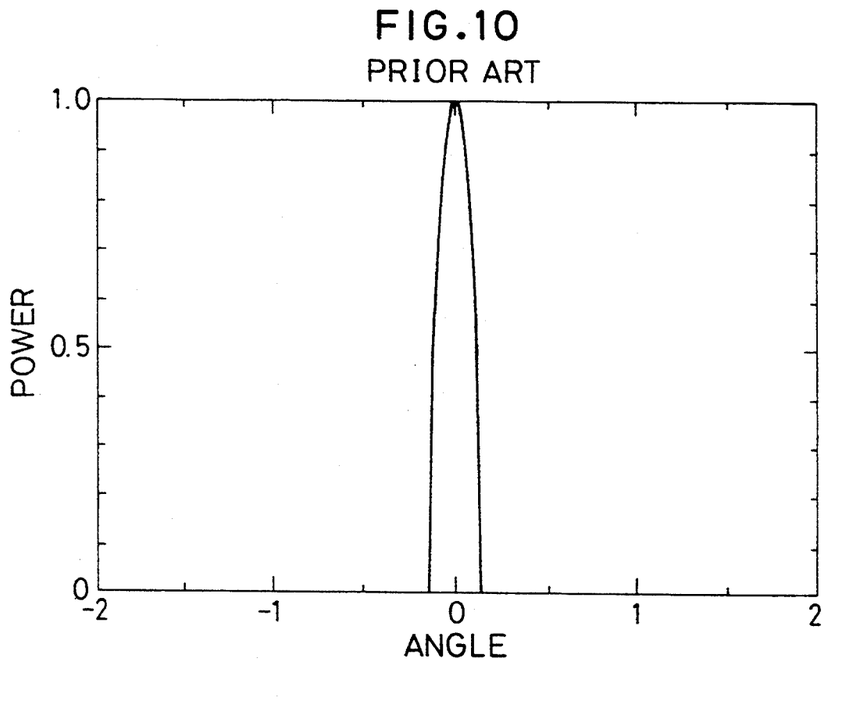
FIG. 10 is a schematic representation of an output signal produced by multiplying the received power signal associated with the main antenna shown in FIG. 8 and the received power signal associated with sub-antenna shown in FIG. 9.

In general, when scattering objects to be observed are distributed discretely as in the case of a radar, the received electric field pattern waveform and power pattern waveform each have an upwardly convex form near an angle at which an object exists, whereas they do not have an upwardly convex form near angles at which no object exists. Therefore, the ability to discriminate scattering objects existing close to each other can be improved without producing distortion in a received pattern by providing an output signal produced by multiplying a received power signal associated with the main antenna by that associated with the sub-antenna only if received power signal pattern waveforms associated with both main antenna and the sub-antenna have an upwardly convex form, that is, their double differential coefficients are negative, and further if the phase difference between the received power signal associated with the main antenna and that associated with the sub-antenna is equal to or less than 90°. FIG. 8 illustrates a power signal received by the main antenna, wherein portions having an upwardly convex form are represented by solid lines. Similarly, FIG. 9 illustrates a power signal received by the sub-antenna wherein portions having an upwardly convex form are represented by solid lines. FIG. 10 illustrates an output signal produced by multiplying the power signal associated with the main antenna by the power signal associated with the sub-antenna.

In the case where there is a small scattering object near a large scattering object, the main beam of the main antenna has a width greater than the width of the main beam of the sub-antenna, and thus the power pattern waveform associated with the main antenna has an upwardly convex form near the angle at which the large scattering object exists, but it may not have an upwardly convex form near the angle at which the small scattering object exists.

Figure 11:
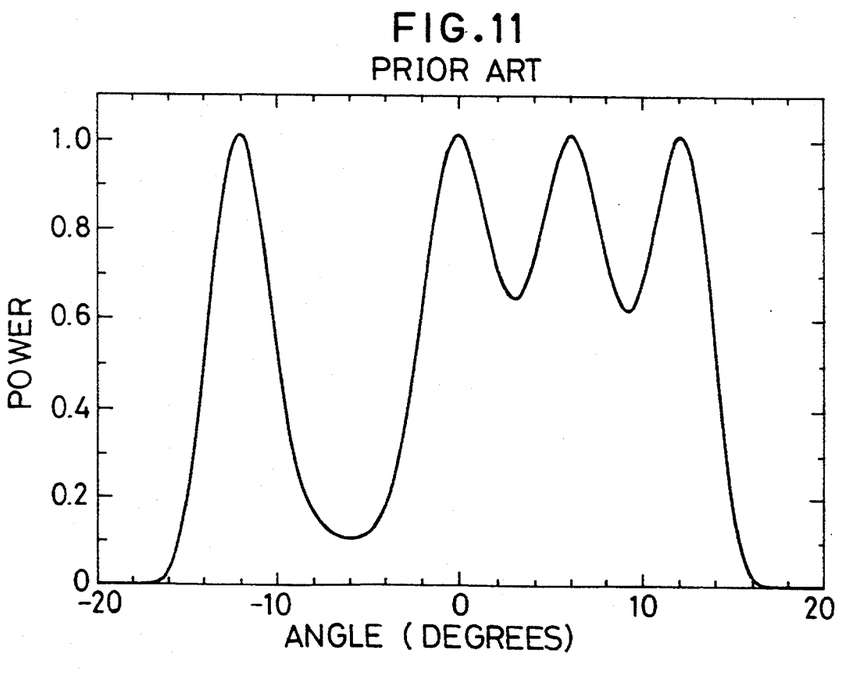
FIG. 11 is a schematic representation of a received power pattern associated with the main antenna in the case where there is a small scattering object near a large scattering object.

For example, if there are point scattering objects in the directions of $-12°$, $-6°$, $0°$, $6°$, and $12°$ wherein the scattering coefficient of the scattering object existing at $-6°$ is 0.1, and the scattering coefficients of the other scattering objects are 1, then the pattern of the signal received by the main antenna is such as that shown in FIG. 11. As can be seen, the received signal pattern does not have an upwardly convex form around $-6°$ at which there is the small scattering object whose scattering coefficient is 0.1.

In such a case, in the above-described beam-width compression method in which a multiplied output signal is provided only if both double differential coefficients of the power signals received by the main antenna and by the sub-antennas are negative, and further if the phase difference between the power signal received by the main antenna and that received by the sub-antenna is equal to or less than 90°, a zero signal is output near the angle at which the small scattering object exists. This means that no signal is output even when there actually exists a scattering object. That is, an output signal which should be output has been missed.

The problem described above can be avoided if the range which the double differential coefficients of the received power signals associated with the main antenna and sub-antenna should meet is expanded from the negative range to such a range less than a predefined positive real number value. Such an expansion of the range results in an output pattern waveform which represents more faithfully the distribution of scattering objects. Thus, it becomes possible to prevent an output signal from being lost at an angle at which a small scattering object exists.

In the beam compression method according to the multiplicative array principle, since there a number of grating lobes in the antenna pattern associated with the sub-antenna, the received power signal associated with the sub-antenna can have various output values for the scattering objects of the same size. Therefore, the value of the final output signal produced by multiplying the power signal received by the main antenna and that received by the sub-antenna cannot be constant. Even in such a case, the output value of the power signal received by the main antenna is substantially constant. Therefore, the above-described problem can be avoided if the received power signal associated with the main antenna is employed as an output signal instead of the signal produced by the multiplying the power signal associated with the main antenna by the power signal associated with the sub-antenna.

In the present invention, in view of the above, the power signal received by the main antenna is output as a final output signal only if both double differential coefficients of power signals received by the main antenna and the sub-antennas are equal to or less than predefined positive real number values, and further if the phase difference between the power signal received by the main antenna and the power signal received by the sub-antennas is equal to or less than 90°.

With this arrangement, the problem described above can be solved, and it becomes possible to obtain an output signal which represents the distribution of scattering objects more faithfully without distortion. The above-described positive real number values serving as reference levels for the double differential coefficients of the power signals received by the main antenna and the sub-antenna may be determined depending on the types of objects to be detected. For example, these number values may be determined experimentally such that the number values may be optimized for the type of a radar such as a harbor radar, air traffic control radar, etc.

DESCRIPTION OF THE PREFERRED EMBODIMENTS

Figure 12:
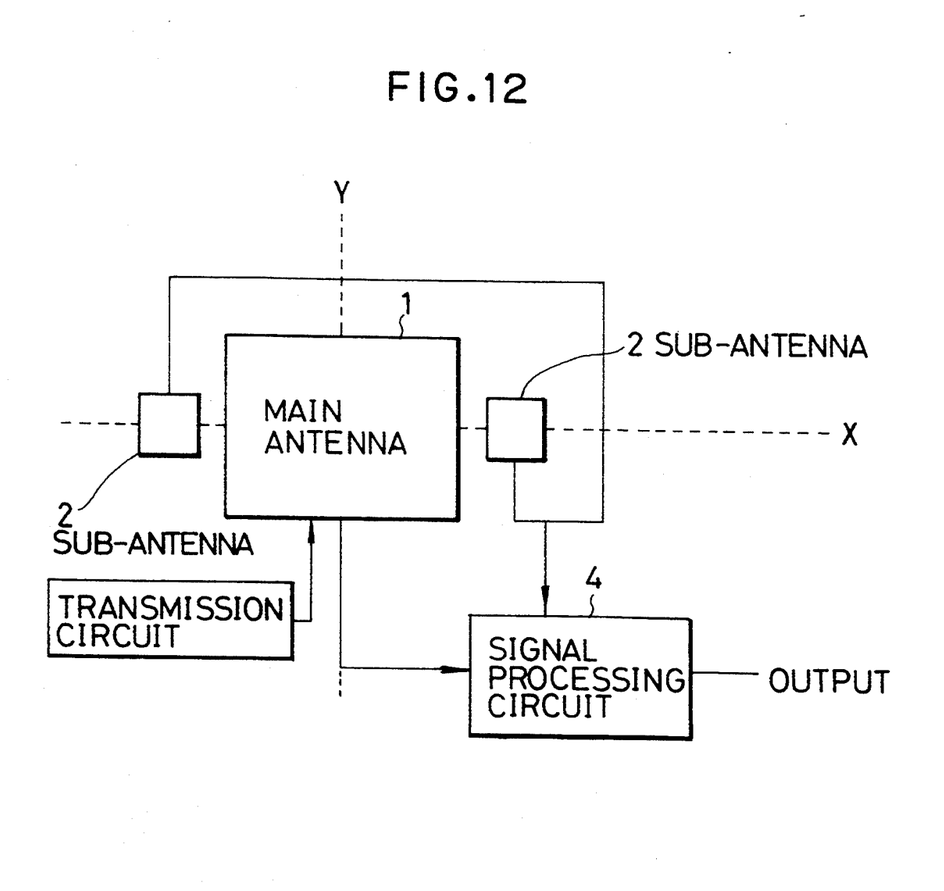
FIG. 12 is a schematic diagram illustrating a configuration of a radar system, for use of explanation on an embodiment of a method of performing beam compression of an antenna pattern according to the present invention.

Now, referring to an embodiment, the present invention will be described in more detail below. Referring to FIG. 12 which illustrates a configuration of a radar system, a method of beam compression in the antenna pattern of a radar system according to one embodiment of the present invention will be described below. In FIG. 12, reference numeral 1 designates a main antenna having a structure such as a horn antenna or an array antenna for transmitting and receiving radio waves. Reference numerals 2, 2 designate dedicated receiving sub-antennas, wherein the sub-antennas may be of arbitrary types such as a dipole antenna, horn antenna, array antenna, etc. These sub-antennas 2, 2 are disposed at both sides of the main antenna at locations adjacent to the main antenna 1 in the direction of the beam width to be compressed of the main antenna (in the X-direction)

such that the direction of the beam axes of the sub-antennas coincide with the direction of the beam axis of the main antenna 1 (in the direction perpendicular to the X-Y plane). Reference numeral 3 designates a transmission circuit, wherein transmission power generated by the transmission circuit is fed to the main antenna 1, and further transmitted by the main antenna 1. Reference numeral 4 designates a signal processing circuit to which received electric field signals of the main antenna 1 and the sub-antennas 2, 2 are fed. Here, each received electric field signal is converted to a power signal, and then each power signal is differentiated twice with respect to the scanning angle so as to produce corresponding double differential coefficients. The signal processing circuit 4 further calculates the phase difference between the received power signal associated with the main antenna and the received power signal associated with the sub-antennas 2, 2, and outputs the received power signal associated with the main antenna 1 as a final output signal only if the differential coefficients of power signals received by the main antenna and the sub-antennas are equal to or less than the predefined positive real number values, and further if the phase difference between the power signal received by the main antenna and the power signal received by the sub-antennas is equal to or less than 90°. In the above processing, received electric field signals associated with the pair of sub-antennas 2, 2 are added to each other first, and then the resultant signal is subjected to the above-described signal processing.

In this radar system configured in the above-described manner, a radio wave is transmitted by the main antenna 1, and when the transmitted radio wave has come back after being reflected by scattering objects, the main antenna 1 and the sub-antennas 2, 2 output received electric field signals corresponding to their respective patterns. The signal processing circuit converts these received electric field signals to power signals. The signal processing circuit then calculates the double differential coefficients of respective received power signals associated with the main antenna 1 and the sub-antennas 2, 2 as well as the phase difference between the received power signal associated with the main antenna 1 and that associated with the sub-antennas 2, 2. Only if the double differential coefficients are equal to or less than the predefined positive real number value, and if the phase difference is equal to or less than 90°, the received power signal associated with the main antenna 1 is output as a final output signal which represents faithfully the distribution of scattering objects without distortion. In the above embodiment, the range of the phase difference has been assumed to be equal to or less than 90°, however 90° may be replaced by a suitable angle less than 90° to improve the resolution in the location of a scattering object. This range may be set experimentally to an optimum value less than 90° depending on the kinds of objects to be detected.

Figure 13:
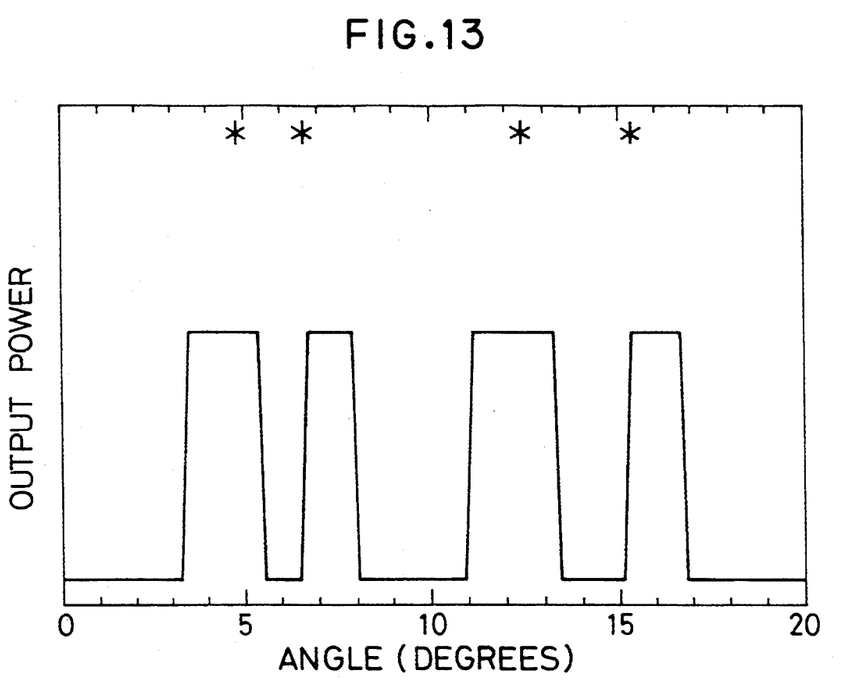
FIG. 13 is a schematic representation of an output power pattern obtained as a result of simulation on the radar system shown in FIG. 12.

FIG. 13 shows a result of simulation on the radar system shown in FIG. 12 wherein the simulation was done assuming that the main antenna is configured with a uniformly distributed rectangular antenna whose antenna length in the scanning direction is ten times the wavelength of the radio wave, and the sub-antennas are configured with uniformly distributed rectangular antennas whose antenna length in the scanning direction is one time the wavelength of the radio wave. In this simulation, it has been also assumed that the received power signal associated with the main antenna is output as a final output signal when the double differential coefficient associated with the main antenna is equal to or less than 0.0607, the double differential coefficient associated with the sub-antennas is equal to or less than 0, and the phase difference is equal to or less than 90°, and a zero output signal is output as the final output signal in any other cases.

In FIG. 13, there is shown a simulation result with respect to the power pattern of a final output signal obtained under the condition that there are point scattering objects in the directions of 4.78°, 6.69°, 12.43°, and 15.01° at the same distance from the antenna system about the rotation axis of the antenna system wherein scattering coefficients of these scattering objects are 0.47, 0.29, 0.98, and 0.31, respectively, and phases of scattered waves from these scattering objects are 120°, 40°, 251°, 147°, respectively. For comparison to the beam compression method according to the present invention, FIG. 14 shows a simulation result of a power pattern of a final output signal for the radar system shown in FIG. 1 using a conventional method of beam compression.

Figure 14:
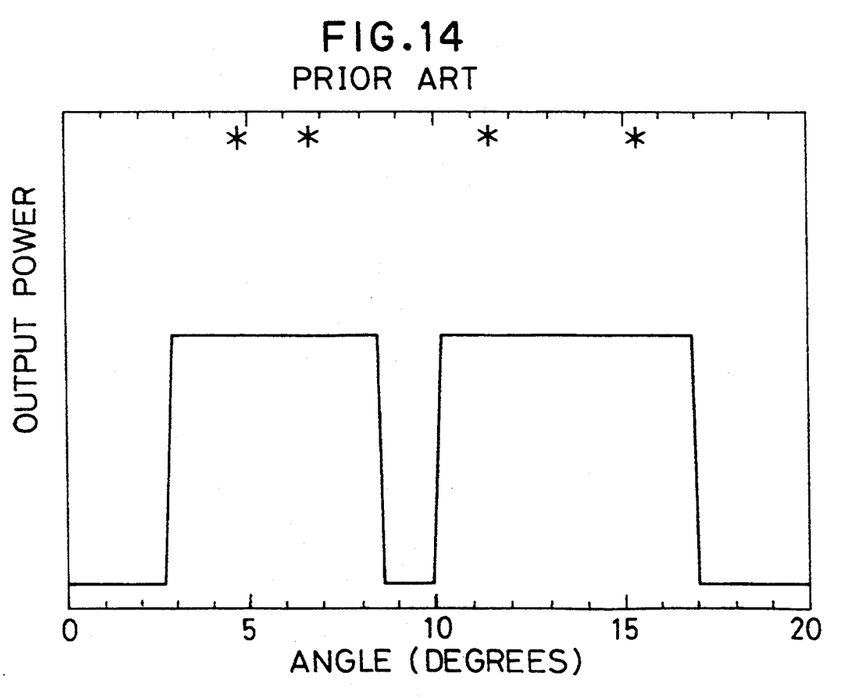
FIG. 14 is a schematic representation of an output power pattern obtained as a result of simulation on a conventional radar antenna system.

In the representations of the simulated power patterns shown in FIGS. 13 and 14, a "1" is output when the output power is greater than 0.1 relative to the reference value which is set to the maximum output power obtained when there is only one point scattering object, and a "0" or nothing is output in the other cases. In these representations, it is determined that a "1" is output when the output power is greater than 0.1 relative to the reference value, based on the fact that a CRT display of a radar system has a dynamic range of about 10 dB. Marks, shown in the upper portions of FIGS. 13 and 14 denote the positions of the scattering objects.

As can be seen from FIGS. 13 and 14, the beam compression method according to the present invention can provide an effectively compressed final output pattern waveform which represents more faithfully the distribution of scattering objects, even under the conditions where the beam compression method according to the conventional technique or according to the previous invention may result in a final output pattern waveform which has great inconsistency with the distribution of scattering objects.

Figure 15:
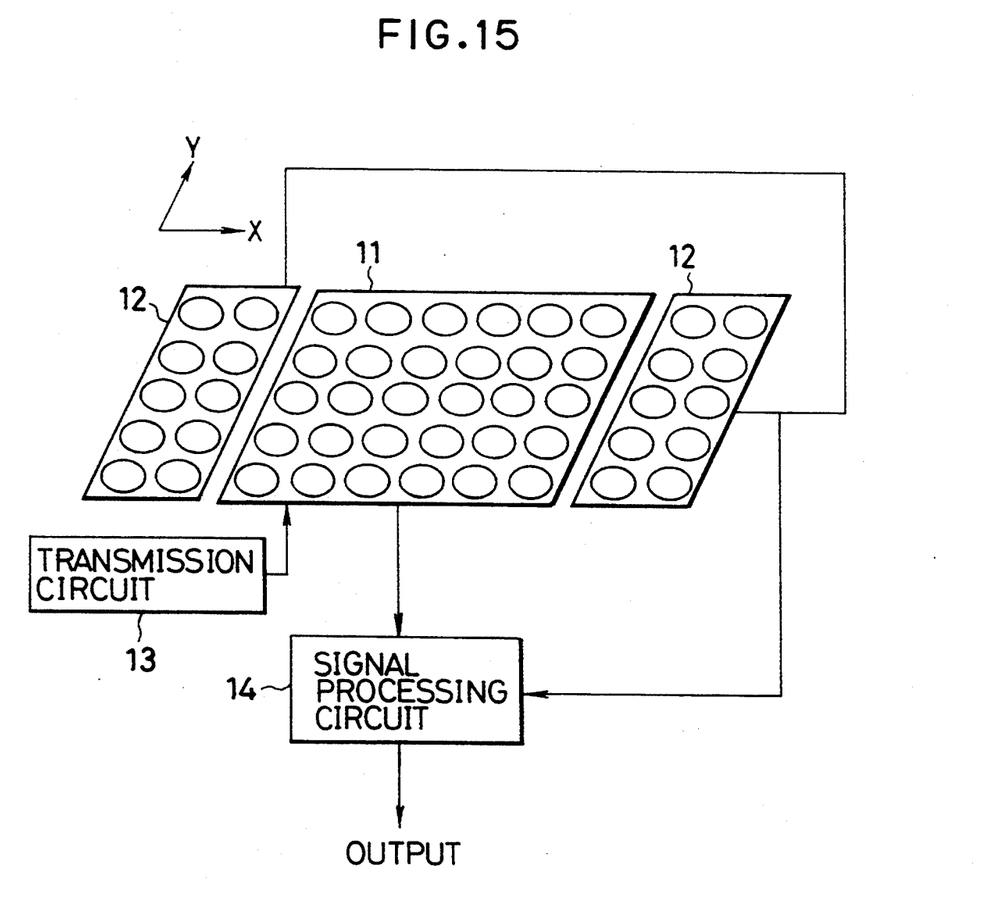
FIG. 15 is a perspective view illustrating a specific example of a configuration of an antenna system of the radar system shown in FIG. 12.

FIG. 15 shows a specific example of a configuration of the antenna system of the radar system shown in FIG. 12. In this example, the main antenna 11 and the sub-antennas 12, 12 each comprise a circular patch array antenna, wherein the sub-antennas 12, 12 are disposed apart from the main antenna 11 in the X-direction.

The transmission circuit 13 may be formed by using known techniques. The signal processing unit 14 may also be configured by using known means or techniques in such a manner that received electric field signals are converted to power signals, and then the amplitude and the phase of the received power signals are converted to digital signals by analog-to-digital (A/D) converters, and furthermore the double differential coefficients of the amplitude with respect to the angle as well as the phase difference are calculated by a computer, and finally comparison of the double differential coefficients and the phase relative to the corresponding reference values is performed by the computer.

Figure 16:
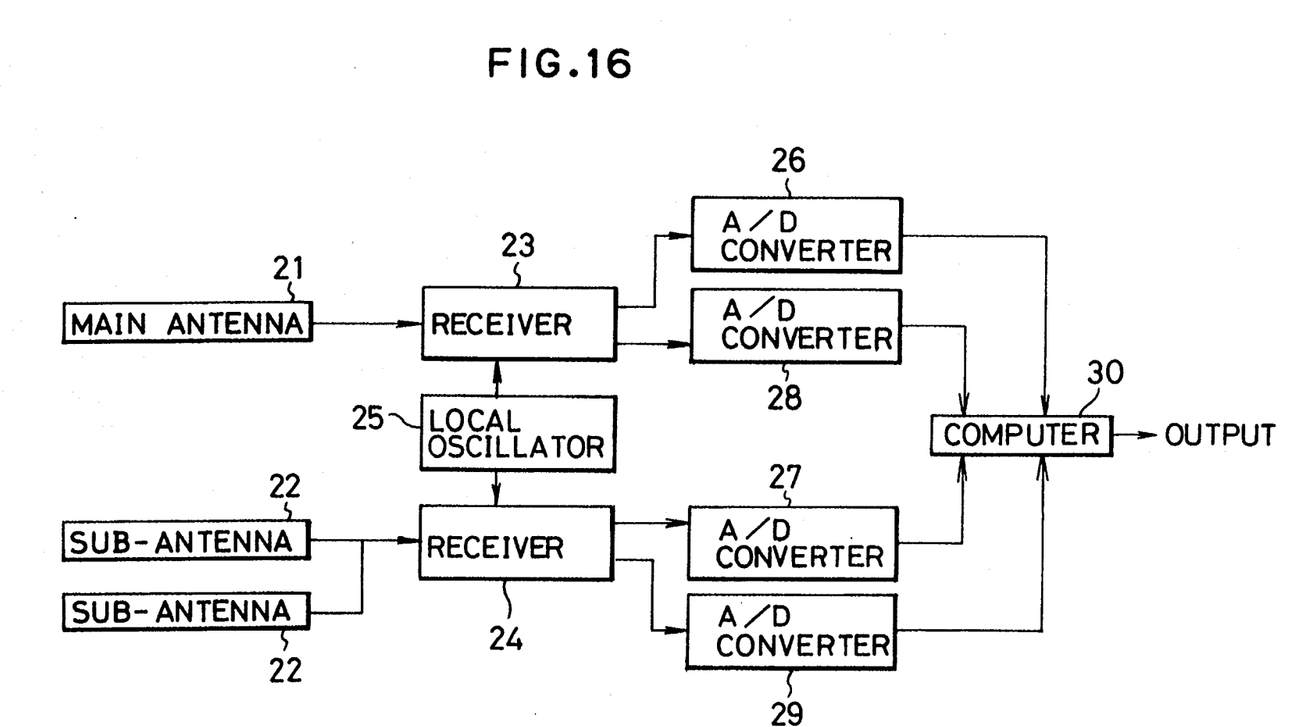
FIG. 16 is a schematic diagram illustrating a specific example of a configuration of a signal processing circuit of the radar system shown in FIG. 12.

One example of such a configuration is shown in FIG. 16. As shown in FIG. 16, this example of a signal processing circuit comprises a main antenna 21; sub-antennas 22, 22; a receivers 23 and 24 for receiving radio waves detected by respective antennas 21 and 22; a local oscillator 25 for supplying the same local oscillation signal to both receivers 23 and 24; A/D converters 26 and 27 for converting amplitudes of power signals supplied by the receivers 23 and 24 into digital signals; A/D converters 28 and 29 for converting phases of power signals supplied by the receivers 23 and 24 into digital signals; and a computer 30 for calculating double differential coefficients of respective output signals of the A/D converters 26 and 27 and making comparison of the resultant double differential coefficients to reference values, and for calculating a phase difference between output signals of the A/D converters 28 and 29 and making comparison of the resultant phase difference to a reference value.

In the signal processing circuit configured in the above-described manner, radio waves received by the main antenna 21 and the sub-antenna 22 are input to the receivers 23 and 24, which in turn output DC signals representing the respective powers and phases with the help of the local oscillation signal wherein the same local oscillation signal is supplied by the local oscillator 25 to both receivers 23 and 24. The output signals of the receivers 23 and 24 are input to the A/D converters 26, 27, 28, and 29 so as to convert the signals into digital forms. Then, the computer 30 calculates the double differential coefficients and the phase difference, and makes comparison of the double differential coefficients and the phase difference to the reference values, and finally outputs the received power signal associated with the main antenna as a final output signal.

In the above-described example, the antenna system of the radar system includes one pair of sub-antennas, however the antenna system may also include plural pairs of sub-antennas of any types such as a dipole antenna, horn antenna, array antenna, etc. When plural pairs of sub-antennas are employed, output signals of the plural pairs of sub-antennas may be added together and the resultant signal may be processed in the same manner as in the case of one pair of sub-antennas. In this case, since the sub-antennas can provide higher received power than one pair of sub-antennas, the antenna gain and the signal-to-noise ratio can be improved.

In the present invention, as described above referring to the embodiment, the received power signal received by the main antenna is output as a final output signal only if the double differential coefficients of the received power signals associated with the main antenna and sub-antennas are equal to or less than the corresponding predefined positive real number values and if the phase difference between the received power signal associated with the main antenna and the received power signal associated with the sub-antennas is equal to or less than 90°, thereby providing the output signal representing more faithfully the distribution of scattering objects without distortion.

What is claimed is:

1. A method of compressing the beam width of the antenna pattern of a radar system, comprising the steps of:

providing an antenna system comprising a main antenna for transmitting and receiving radio waves and one or more pairs of dedicated receiving sub-antennas which are disposed at both sides adjacent to said main antenna in the direction of the beam width to be compressed of said main antenna such that the directions of the beam axes of said sub-antennas coincide with the direction of the beam axis of said main antenna;

scanning the antenna beam of said antenna system in the direction of said beam width to be compressed, and receiving by the main antenna and sub-antennas the radio wave which was transmitted by the main antenna and reflected by scattering objects and has finally come back;

converting the respective received signals received by the main antenna and the sub-antennas to power signals;

performing double differential processing with respect to the scanning angle on the received power signals received by the main antenna and the sub-antennas, respectively, thereby producing double differential coefficients of the received power signals associated with the main antenna and the sub-antennas, respectively;

calculating the phase difference between the received power signal received by the main antenna and the received power signal received by the sub-antennas; and outputting the received power signal received by the main antenna as a final output signal only if the conditions that both said double differential coefficients of the received power signals associated with the main antenna and the sub-antennas be equal to or less than predefined corresponding positive real number values and that said phase difference be equal to or less than 90° are satisfied, and outputting a zero signal as the final output signal if said conditions are not satisfied.

2. A method of compressing the beam width of the antenna pattern of a radar system, according to claim 1, wherein said condition that said phase difference be equal to or less than 90° is such as that said phase difference be equal to or less than a predefined angle less than 90°.

3. A method of compressing the beam width of the antenna pattern of a radar system, according to claim 1, wherein:

said step of providing an antenna system includes the step of disposing plural pairs of the sub-antennas; and said step of converting the received signals to power signals includes the steps of adding received signals received by the pairs of sub-antennas together, and converting the sum of the received signals received by the pairs of sub-antennas to a power signal.

4. A method of compressing the beam width of the antenna pattern of a radar system, according to claim 2, wherein:

said step of providing an antenna system includes the step of disposing plural pairs of the sub-antennas; and said step of converting the received signals to power signals includes the steps of adding received signals received by the pairs of sub-antennas together, and converting the sum of the received signals received by the pairs of sub-antennas to a power signal.

* * * * *